US008139176B2

(12) United States Patent
Lee et al.

(10) Patent No.: US 8,139,176 B2
(45) Date of Patent: Mar. 20, 2012

(54) DISPLAY SUBSTRATE, A METHOD OF MANUFACTURING THE DISPLAY SUBSTRATE AND A DISPLAY APPARATUS HAVING THE DISPLAY SUBSTRATE

(75) Inventors: Kyung-Jin Lee, Seoul (KR); Kyung-Wook Kim, Seoul (KR); Hyuk-Jin Kim, Cheonan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 735 days.

(21) Appl. No.: 12/098,176

(22) Filed: Apr. 4, 2008

(65) Prior Publication Data

US 2008/0297678 A1    Dec. 4, 2008

(30) Foreign Application Priority Data

Jun. 4, 2007  (KR) .................................. 2007-54277

(51) Int. Cl.
*G02F 1/136*    (2006.01)
(52) U.S. Cl. ......................................... 349/44; 349/139

(58) Field of Classification Search .................. 349/110, 349/44, 46, 111, 43, 138, 139; 438/30; 257/E21.535
See application file for complete search history.

(56) References Cited

U.S. PATENT DOCUMENTS

| 6,762,805 B2 * | 7/2004 | Ishino .............................. 349/46 |
| 2002/0196382 A1 | 12/2002 | Ishino |
| 2004/0263710 A1 * | 12/2004 | Song et al. ....................... 349/44 |
| 2005/0001944 A1 | 1/2005 | Wu et al. |

FOREIGN PATENT DOCUMENTS

| KR | 1020010027285 | 4/2001 |
| KR | 1020030016053 | 2/2003 |
| KR | 1020070008882 | 1/2007 |

* cited by examiner

*Primary Examiner* — Thoi Duong
(74) *Attorney, Agent, or Firm* — F. Chau & Associates, LLC

(57) ABSTRACT

A display substrate includes a gate line, a data line, a thin film transistor, a pixel electrode, and a light blocking layer. The data line is insulated from the gate line and crosses the gate line. The thin film transistor is connected to the gate line and the data line. The thin film transistor is formed in a pixel. The pixel electrode is formed in the pixel and connected to the thin film transistor. The light blocking layer is formed from a same layer as the data line, wherein the light blocking layer is adjacent to a side of the data line.

11 Claims, 14 Drawing Sheets

FIG.4
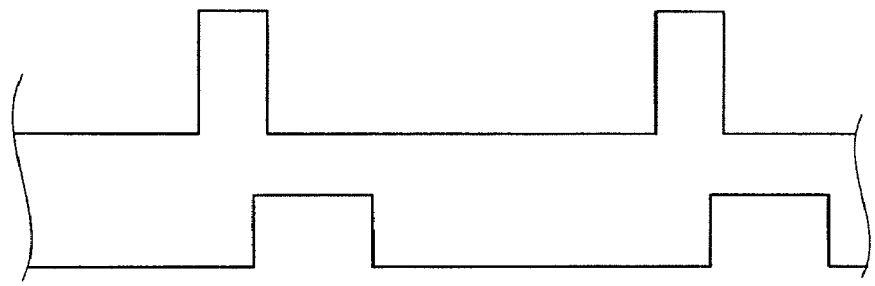
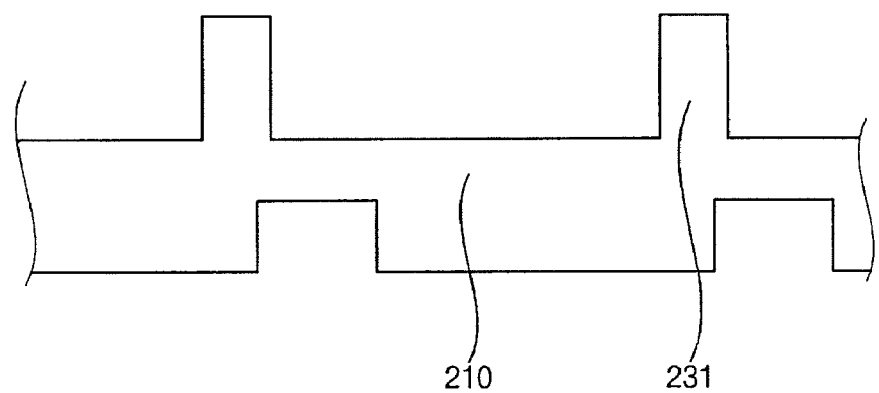

FIG.6
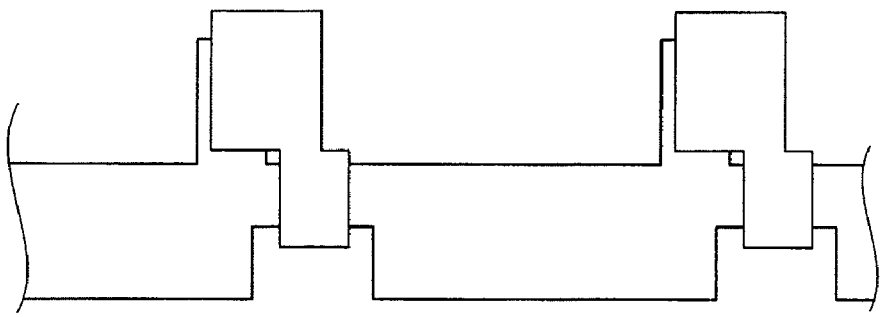
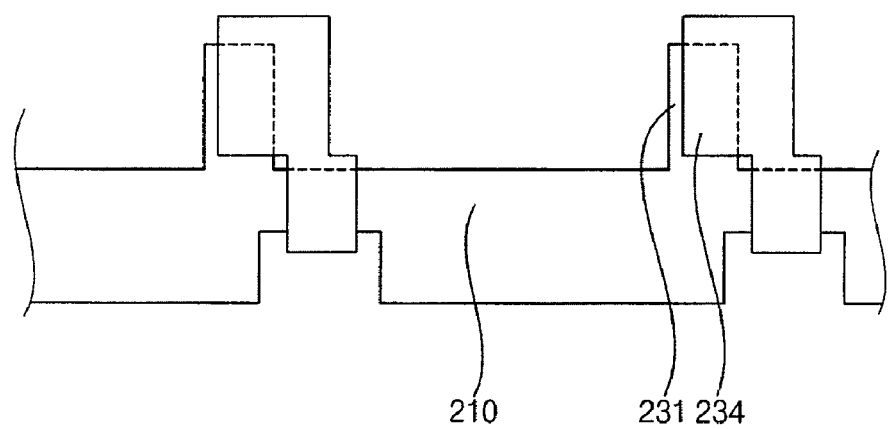

DISPLAY SUBSTRATE, A METHOD OF MANUFACTURING THE DISPLAY SUBSTRATE AND A DISPLAY APPARATUS HAVING THE DISPLAY SUBSTRATE

CROSS-REFERENCE TO RELATED APPLICATION

This application claims priority under 35 U.S.C. §119 to Korean Patent Application No. 2007-54277, filed on Jun. 4, 2007 in the Korean Intellectual Property Office (KIPO), the disclosure of which is incorporated by reference herein in its entirety.

BACKGROUND OF THE INVENTION

1. Technical Field

The present invention relates to a display substrate capable of improving an aperture ratio and preventing a vertical line spot defect, a method of manufacturing the display substrate, and a display apparatus having the display substrate.

2. Discussion of the Related Art

A liquid crystal display apparatus includes a first display substrate, a second display substrate, and a liquid crystal layer. The first display substrate includes a thin film transistor and a pixel electrode. The second display substrate includes a color filter and a common electrode. The liquid crystal layer is disposed between the first and second display substrates.

The first display substrate additionally includes a gate line and a data line, which are connected to the thin film transistor, formed in each pixel of a plurality of pixels to independently drive the pixels. The first display substrate further includes light blocking layers disposed adjacent to both sides of the data line to block light. The light blocking layer is in an electrical floating state.

To improve the aperture ratio, the distance between the data line and the light blocking layer is minimized. However, in conventional exposing devices the distance between the data line and the light blocking layer has been reduced to about 5 µm. Therefore, the data line and the light blocking layer are not formed from a same metal layer.

When the data line and the light blocking layer are formed from different layers, the data line and the light blocking layer may be misaligned with respect to each other. Therefore, parasitic capacitances formed on left and right sides of the data line are different from each other, thus causing a pixel voltage to be distorted and consequently a vertical line spot defect may be generated.

Accordingly, there exists a need for a display substrate that is capable of improving an aperture ratio and preventing a vertical line spot defect.

SUMMARY OF THE INVENTION

A display substrate according to an exemplary embodiment of the present invention includes a gate line, a data line, a thin film transistor, a pixel electrode, and a light blocking layer. The data line is insulated from the gate line and crosses the gate line. The thin film transistor is connected to the gate line and the data line and formed in a pixel. The pixel electrode is formed in the pixel and connected to the thin film transistor. The light blocking layer is formed from a same layer as the data line, wherein the light blocking layer is adjacent to a side of the data line.

The thin film transistor includes a gate electrode, a source electrode, and a drain electrode. The gate electrode is connected to the gate line. The source electrode is connected to the data line. The drain electrode is spaced apart from the source electrode and electrically connected to the pixel electrode.

The light blocking layer may be electrically separated from the data line, the source electrode, and the drain electrode to remain in a floating state. Alternatively, the light blocking layer may be connected to the drain electrode.

A distance between the light blocking layer and the data line is about 3.0 µm to about 4.0 µm.

An edge portion of the pixel electrode overlaps with the light blocking layer.

The display substrate may further include a first insulating layer and a second insulating layer. The first insulating layer is formed between a first metal pattern having the gate line and the gate electrode, and a second metal pattern having the data line, the source electrode, the drain electrode and the light blocking layer. The second insulating layer is formed between the pixel electrode, and the second metal pattern having the data line, the source electrode, the drain electrode and the light blocking layer and has a contact hole formed therethrough. The pixel electrode is electrically connected with the drain electrode through the contact hole.

In a method of manufacturing a display substrate according to an exemplary embodiment of the present invention, a gate line is formed on a substrate. A first insulating layer is formed on the substrate having the gate line formed thereon. A metal layer is formed on the first insulating layer. A data line and a light blocking layer are formed from the metal layer. The data line crosses the gate line. The light blocking layer is disposed adjacent to a side of the data line. A second insulating layer is formed on the substrate having the data line and the light blocking layer formed thereon. A pixel electrode is formed on the substrate having the second insulating layer formed thereon.

The data line and the light blocking layer are formed as follows. A photoresist pattern is formed on the metal layer. A portion of the photoresist pattern corresponding to the data line and the light blocking layer is thicker than a portion of the photoresist pattern corresponding to a region between the data line and the light blocking layer. The photoresist pattern is etched-back to expose the region between the data line and the light blocking layer. The data line and the light blocking layer are formed using the etched-back photoresist pattern as an etch-stop layer. The photoresist pattern is formed by using a slit mask or a halftone mask.

In the process of forming the gate line, a gate electrode connected to the gate line may be formed. In the process of forming the data line and the light blocking layer, a source electrode and a drain electrode may be formed. The source electrode is connected to the data line. The drain electrode is spaced apart from the source electrode and electrically connected to the pixel electrode. The light blocking layer may be electrically separated from the data line, the source electrode and the drain electrode. Alternatively, the light blocking layer may be connected to the drain electrode.

A display apparatus according to an exemplary embodiment of the present invention includes a first display substrate, a second display substrate and a liquid crystal layer. The first display substrate includes a gate line, a data line, a thin film transistor, a pixel electrode, and a light blocking layer. The data line is insulated from the gate line and crosses the gate line. The thin film transistor is connected to the gate line and the data line and formed in a pixel. The pixel electrode is formed in the pixel and connected to the thin film transistor. The light blocking layer is formed from a same layer as the data line and disposed adjacent to a side of the data line. The second display substrate is opposite to the first display substrate. The second display substrate includes a black matrix formed between the pixels. The black matrix covers the data line and the light blocking layer. The liquid crystal layer is disposed between the first display substrate and the second display substrate.

BRIEF DESCRIPTION OF THE DRAWINGS

The above and other features of the present invention will become more apparent by describing in detail exemplary embodiments thereof with reference to the accompanying drawings, in which:

FIGS. 4, 6, 8, and 13 are layout views of the first display substrate shown in FIGS. 1 and 2 illustrating a manufacturing process thereof according to an exemplary embodiment of the present invention;

DESCRIPTION OF EXEMPLARY EMBODIMENTS

Exemplary embodiments of the invention are described more fully hereinafter with reference to the accompanying drawings. This invention may, however, be embodied in many different forms and should not be construed as limited to the embodiments set forth herein.

It will be understood that when an element or layer is referred to as being "on", "connected to" or "coupled to" another element or layer, it can be directly on, connected or coupled to the other element or layer or intervening elements or layers may be present.

Figure 1:
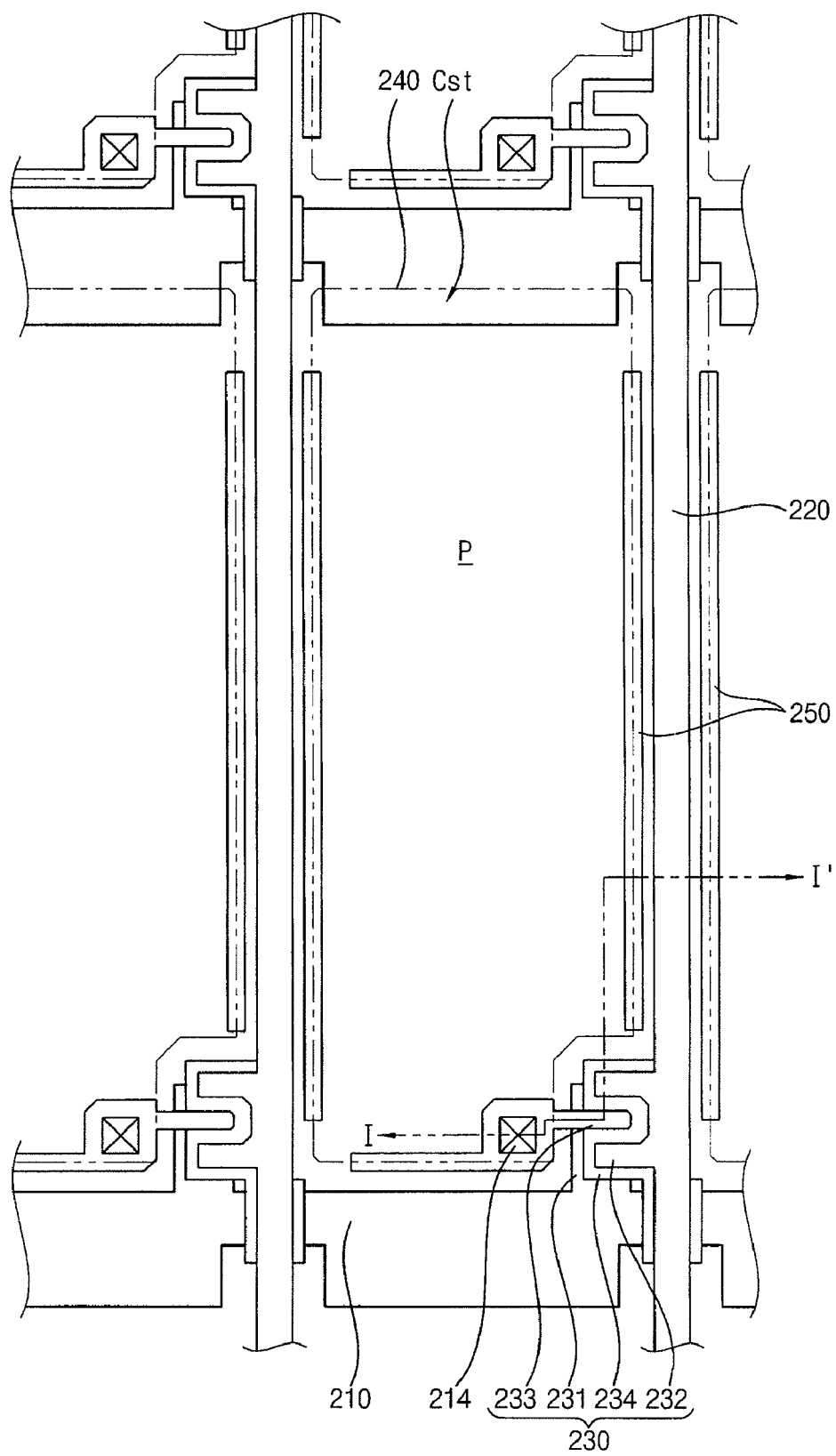
FIG. 1 is a layout view illustrating a portion of a first display substrate of a display apparatus according to an exemplary embodiment of the present invention.
Figure 2:
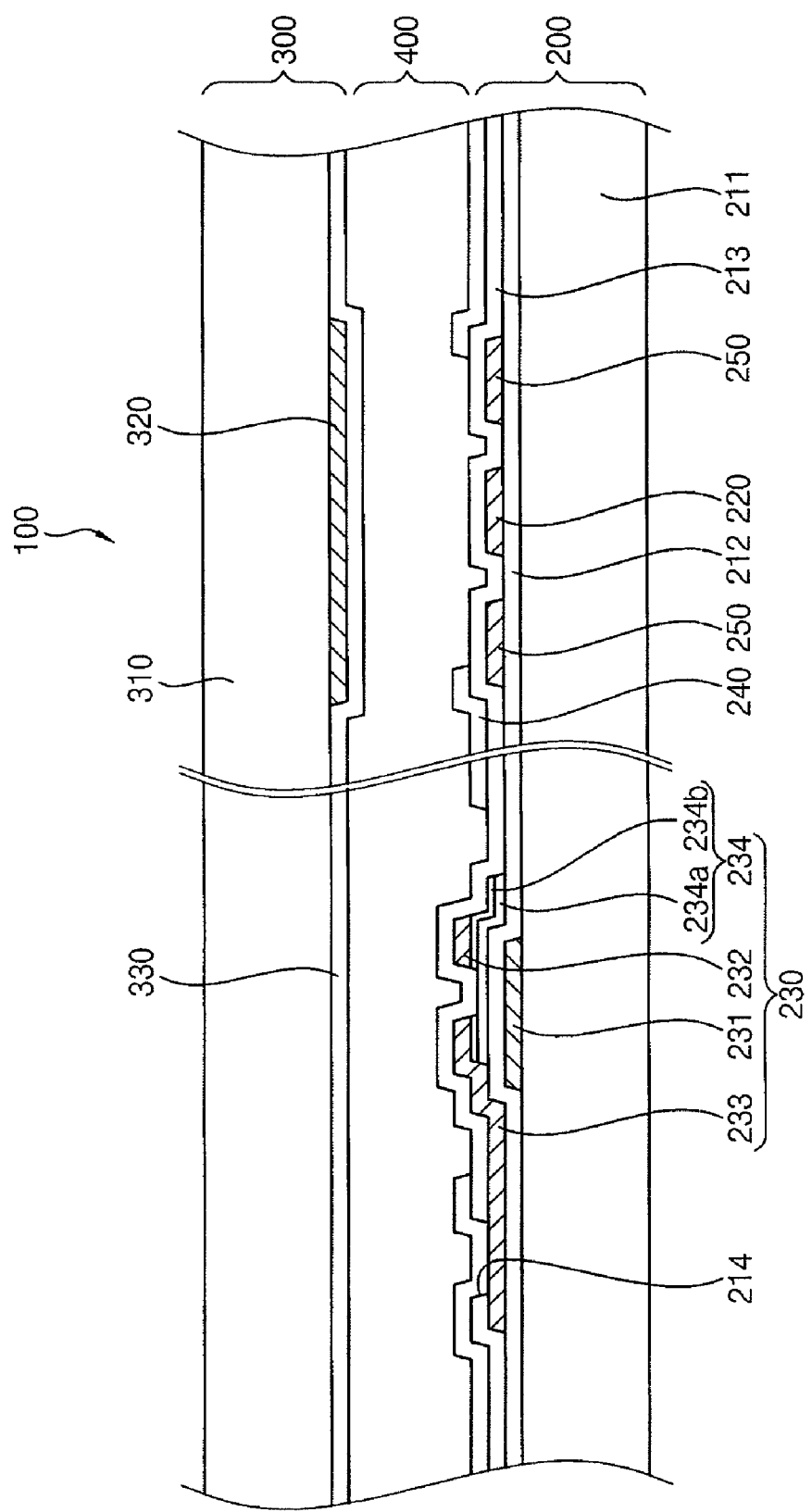
FIG. 2 is a cross-sectional view of the display apparatus taken along line I-I' shown in FIG. 1.

FIG. 1 is a layout view illustrating a portion of a first display substrate of a display apparatus according to an exemplary embodiment of the present invention. FIG. 2 is a cross-sectional view of the display apparatus taken along line I-I' shown in FIG. 1.

Referring to FIGS. 1 and 2, a display apparatus 100 includes a first display substrate 200, a second display substrate 300 and a liquid crystal layer 400. The second display substrate 300 is opposite to the first display substrate 200. The liquid crystal layer 400 is disposed between the first and second display substrates 200 and 300.

The first display substrate 200 includes a gate line 210, a data line 220, a thin film transistor 230, a pixel electrode 240, and a light blocking layer 250 to independently drive pixels P arranged in a matrix shape.

The gate line 210 is formed on a first transparent substrate 211. For example, the first transparent substrate 211 may include a glass material or a plastic material. For example, the gate line 210 may be extended in a first direction.

A first insulating layer 212 may be formed on the first transparent substrate 211 having the gate line 210 formed thereon. The first insulating layer 212 protects the gate line 210. The gate line 210 is insulated by the first insulating layer 212. For example, the first insulating layer 212 may include silicon nitride (SiNx) or silicon oxide (SiOx).

The data line 220 is formed on the first insulating layer 212. The data line 220 is insulated from the gate line 210 by the first insulating layer 212. The data line 220 is extended in a second direction crossing with the first direction. For example, the second direction may be substantially perpendicular to the first direction.

At least one thin film transistor 230 may be formed in each pixel P to independently drive the pixels P. The thin film transistor 230 is connected to the gate line 210 and the data line 220 to receive a gate signal and a pixel voltage, respectively. The thin film transistor 230 is turned on by the gate signal. The pixel voltage is applied to each pixel P.

The thin film transistor 230 includes a gate electrode 231, a source electrode 232, and a drain electrode 233. The gate electrode 231 is formed from a same layer as the gate line 210 and connected to the gate line 210. The source electrode 232 is formed from a same layer as the data line 220 and connected to the data line 220. The drain electrode 233 is spaced apart from the source electrode 232. The drain electrode 233 is electrically connected to the pixel electrode 240 formed in each pixel P.

The thin film transistor 230 may further include an active pattern 234. The active pattern 234 is formed on the first insulating layer 212 and disposed between the source electrode 232 and the drain electrode 233. The active pattern 234 overlaps with the gate electrode 231. The active pattern 234 may include a semiconductor layer 234a and an ohmic contact layer 234b. The semiconductor layer 234a is a channel through which a current flows. The ohmic contact layer 234b reduces a contact resistance between the semiconductor layer 234a and the source and drain electrodes 232 and 233. For example, the semiconductor layer 234a may include amorphous silicon (a-Si), and the ohmic contact layer 234b may include amorphous silicon doped with n type dopants at a high concentration (n+a-Si).

A second insulating layer 213 may be formed on the first transparent substrate 211 having the data line 220 formed thereon. The second insulating layer 213 protects the data line 220 and the thin film transistor 230. The data line 220 and the thin film transistor 230 are insulated by the second insulating layer 213. For example, the second insulating layer may include silicon nitride (SiNx) or silicon oxide (SiOx). An organic layer (not shown) may be formed on the second insulating layer 213. The organic layer planarizes a surface of the first display substrate 200.

The pixel electrode 240 is formed in each pixel P. The pixel electrode 240 is electrically connected to the thin film transistor 230. The pixel electrode 240 is formed on the second insulating layer 213. The pixel electrode 240 may include a transparent conductive material for transmitting light. For example, the pixel electrode 240 may include indium zinc oxide (IZO) or indium tin oxide (ITO).

The pixel electrode 240 is electrically connected to the drain electrode 233 through a contact hole 214 formed through the second insulating layer 213. When the gate signal is applied to the gate electrode 231 of the thin film transistor 230 through the gate line 210, the thin film transistor 230 is turned on. When the thin film transistor 230 is turned on, the pixel electrode 240 receives the pixel voltage applied to the source electrode 232 through the data line 220.

The pixel electrode 240 partially overlaps with the gate line 210 to form a storage capacitor Cst. The pixel voltage applied to the pixel electrode 240 is maintained during a frame by the storage capacitor Cst. Alternatively, the pixel electrode 240 may partially overlap with a storage line (not shown) to form the storage capacitor Cst.

The pixel electrode 240 may include an opening pattern through which each pixel P has a plurality of domains. The opening pattern improves a viewing angle. Alternatively, the pixel electrode 240 may include a main electrode and a sub electrode. When the pixel electrode 240 includes the main electrode and the sub electrode, each pixel P may include two thin film transistors respectively connected to the main electrode and the sub electrode.

The light blocking layer 250 is formed in regions adjacent to both sides of the data line 220 to block light passing through sides of each pixel P. For example, the light blocking layer 250 may be spaced apart from the data line 220 and extended in the second direction. The light blocking layer 250 covers a left side of each pixel P and a right side of each pixel P. For example, the data line 220 may have a line width of about 4.5 µm and the light blocking layer 250 may have a line width of about 4.0 µm. A lower side of each pixel P may be covered by a portion of the light blocking layer 250 extended from the drain electrode 233 and an upper side of each pixel P may be covered by a portion of the light blocking layer 250 extended from the gate line 210 to the storage capacitor Cst.

The light blocking layer 250 may overlap with a side portion of the pixel electrode 240 to more effectively block the light passing through the sides of each pixel P.

In the present exemplary embodiment, the light blocking layer 250 is formed from a same layer as the data line 220. When the light blocking layer 250 is formed from the same metal layer as the data line 220, the data line 220 and the light blocking layer 250 are self-aligned so that a distance between a portion of the light blocking layer 250 formed in the region adjacent the left side of the data line 220 and a portion of the light blocking layer 250 formed in the region adjacent the right side of the data line 220 may be uniform. Therefore, a vertical line spot defect caused by a misalignment of the data line 220 and the light blocking layer 250 with respect to each other may be prevented.

Furthermore, in the present exemplary embodiment, the light blocking layer 250 is spaced apart from the data line 220 by about 3.0 µm to about 4.0 µm to improve an aperture ratio. In order to enhance an aperture ratio, the distance between the data line 220 and the light blocking layer 250 is reduced. However, conventional methods do not permit reduction of the distance between the data line 220 and the light blocking layer 250 to be less than about 5 µm due to a limitation of an exposure apparatus. To accomplish the reduced spacing, a slit mask or a half-tone mask is used in the exposure process, which reduces the distance between the data line 220 and the light blocking layer 250 to be in a range of about 3 µm to about 4 µm. Therefore, an aperture ratio of the display apparatus 100 may be improved.

The light blocking layer 250 is electrically separated from the data line 220, the source electrode 232 and the drain electrode 233 to remain in a floating state. The light blocking layer is insulated from the pixel electrode 240 by the second insulating layer 213. Alternatively, the light blocking layer 250 may be connected to the drain electrode 233.

The second display substrate 300 is opposite to the first display substrate 200. The liquid crystal layer 400 is disposed between the first and second display substrates 200 and 300. A common electrode 330 is formed on an opposing surface of a second transparent substrate 310, which faces the first display substrate 200. The common electrode 330 may include a transparent conductive material so that light passes through the common electrode 330. For example, the common electrode may include indium zinc oxide (IZO) or indium tin oxide (ITO). The common electrode 330 may include an opening pattern to improve a viewing angle.

The second display substrate 300 may further include a black matrix 320. The black matrix 320 is formed in a boundary area of the pixels P and blocks light passing through the boundary area of the pixels P so that a contrast ratio may be improved.

The black matrix 320 covers the data line 220 and the light blocking layer 250 to block light slantingly passing through a region between the data line 220 and the light blocking layer 250. The width of the black matrix 320 may be preferably minimized to improve the aperture ratio. For example, when the data line 220 and the light blocking layer 250 have a line width of about 4.5 µm and about 4.0 µm, respectively, and the distance between the data line 220 and the light blocking layer 250 is about 3.0 µm to about 4.0 µm, the black matrix 320 may have a width of about 19.0 µm to about 21.0 µm.

The liquid crystal layer 400 includes liquid crystal molecules having an anisotropy refractive index and an anisotropic dielectric constant, which are arranged in a predetermined pattern. An electric field between the pixel electrode 240 and the common electrode 330 changes the arrangement of the liquid crystal molecules and the arrangement of the liquid crystal molecules controls an amount of light passing through the liquid crystal layer 400.

Figure 3:
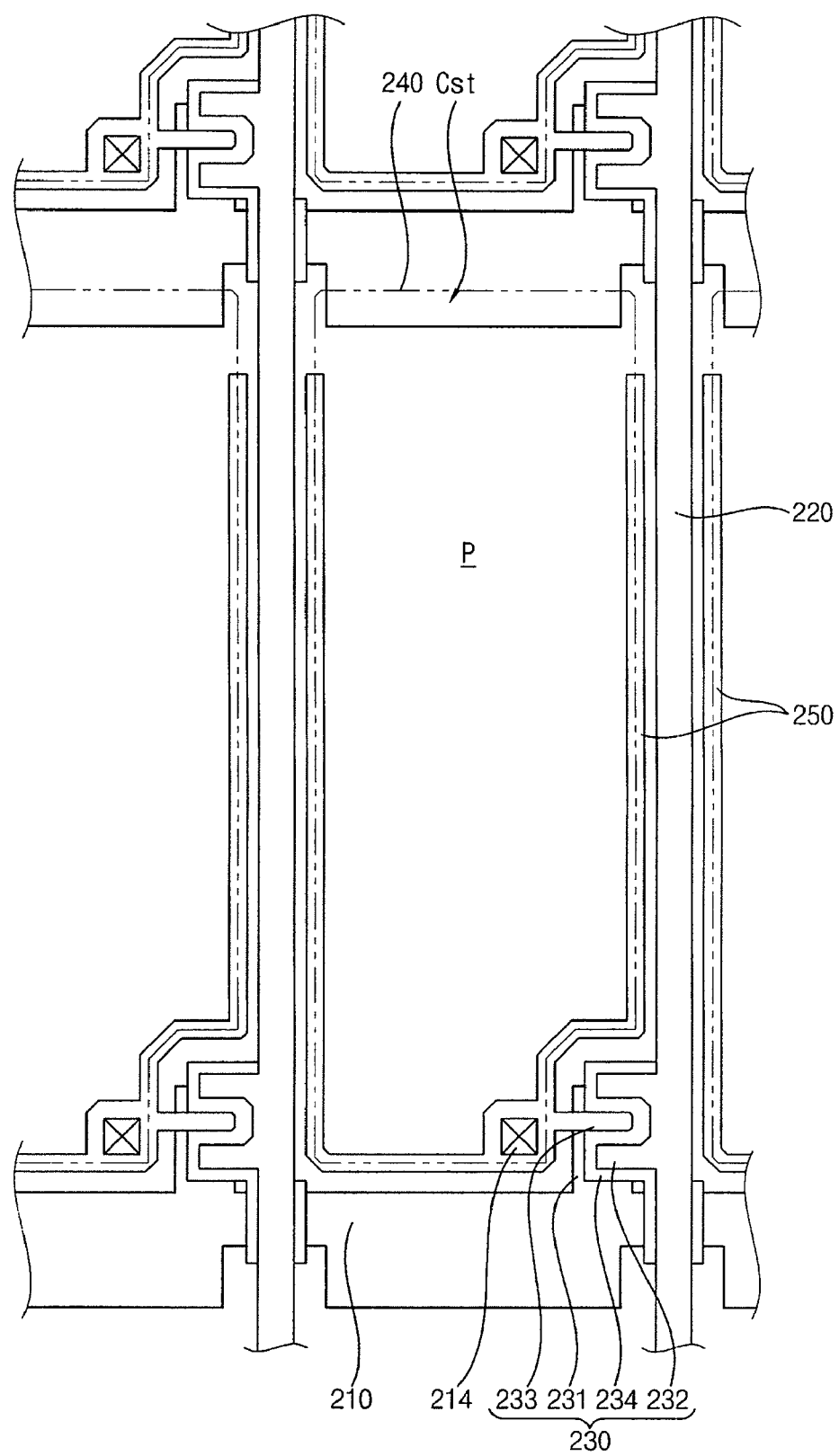
FIG. 3 is a layout view illustrating a portion of a first display substrate of a display apparatus according to an exemplary embodiment of the present invention.

FIG. 3 is a layout view illustrating a portion of a first display substrate of a display apparatus according to an exemplary embodiment of the present invention. The first display substrate of the present exemplary embodiment is the same as the first display substrate shown in FIG. 1, except with respect to, for example, the light blocking layer 250. Thus, the same reference numerals will be used to refer to the same or like elements as those described above with reference to FIG. 1.

Referring to FIG. 3, the light blocking layer 250 is connected to the drain electrode 233 in each pixel P. For example, the light blocking layer 250 is formed in the left and right sides of each pixel P. The light blocking layer 250 is extended along side portions of each pixel P to be connected to the drain electrode 233 formed in the lower side of each pixel P. The light blocking layer 250 and the drain electrode 233 overlap with a side portion of the pixel electrode 240 to block light passing through the side portion of the pixel electrode 240.

The light blocking layer 250 is electrically connected to the pixel electrode 240 through the drain electrode 233. When the light blocking layer 250 remains in a floating state, parasitic capacitances are respectively formed between the light blocking layer 250 and the pixel electrode 240, between the light blocking layer 250 and the data line 220, and between the data line 220 and the pixel electrode 240. As a result, the total parasitic capacitance may have an effect on the data line 220 so that the pixel voltage applied through the data line 220 may be distorted to induce the vertical line spot defect.

However, when the light blocking layer 250 is electrically connected to the pixel electrode 240, only the parasitic capacitance between the light blocking layer 250 and the data line 220 may be generated. Therefore, since the total parasitic capacitance that may have an effect on the data line 220 may be reduced, and the parasitic capacitance may be uniform throughout the pixel P, the vertical line spot defect may be prevented.

Furthermore, when the light blocking layer 250 is electrically connected to the pixel electrode 240, a lateral field between the light blocking layer 250 and the data line 220, which induces light leakage at the side portion of the pixel electrode 240, may be prevented. Therefore, the width of the black matrix is reduced so that the aperture ratio of the display apparatus 100 may increase.

When the distance between the data line 220 and the light blocking layer 250 decreases or the lateral field generated in the side portion of the pixel electrode 240 is prevented, the width of the black matrix 320 may be further reduced and the aperture ratio of the display apparatus 100 may be further improved.

Figure 5:
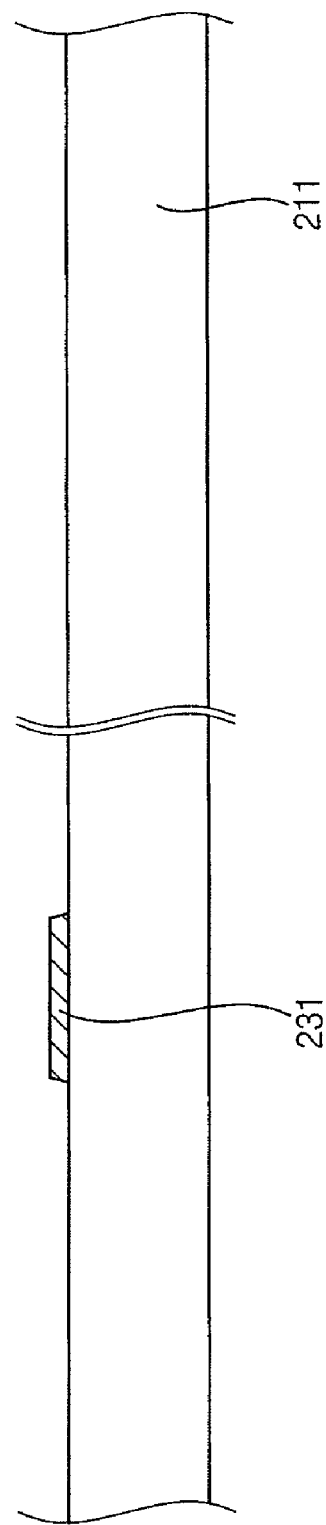
FIG. 5 is a cross-sectional view of a portion of the first display substrate shown in FIG. 4.
Figure 7:
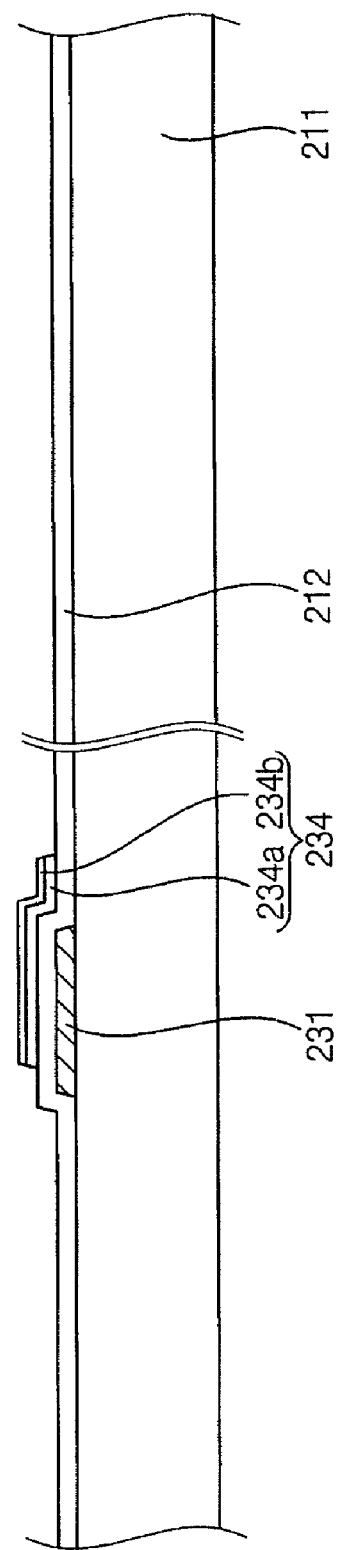
FIG. 7 is a cross-sectional view of a portion of the first display substrate shown in FIG. 6.
Figure 8:
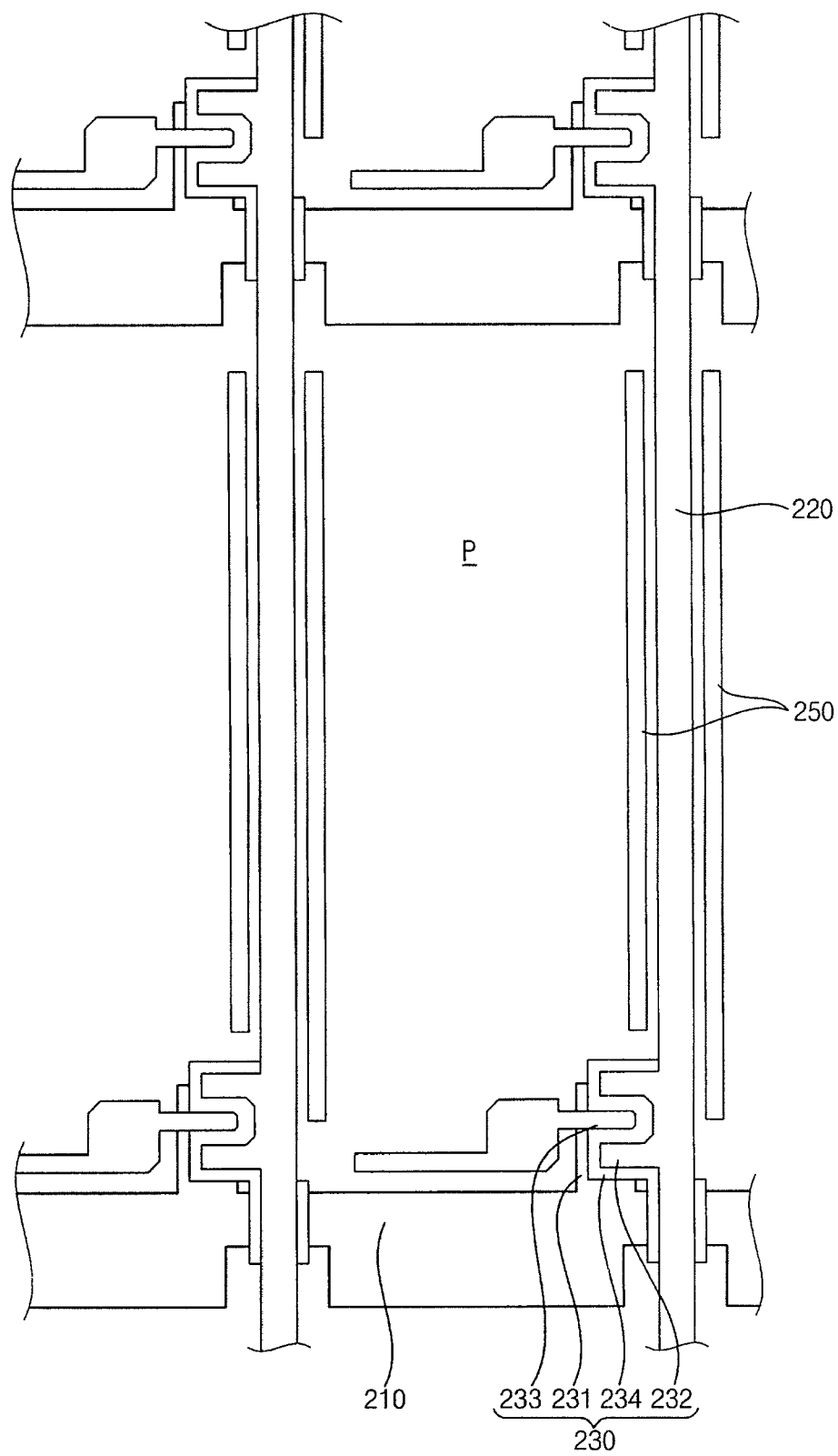

FIGS. 4, 6, 8 and 13 are layout views of the first display substrate shown in FIGS. 1 and 2 illustrating a manufacturing process thereof according to an exemplary embodiment of the present invention. FIG. 5 is a cross-sectional view of a portion of the first display substrate shown in FIG. 4. FIG. 7 is a cross-sectional view of a portion of the first display substrate shown in FIG. 6. FIGS. 9, 10, 11 and 12 are cross-sectional views of a portion of the first display substrate shown in FIG. 8 illustrating a manufacturing process thereof according to an exemplary embodiment of the present invention. FIG. 14 is a cross-sectional view of a portion of the first display substrate shown in FIG. 13.

Referring to FIGS. 4 and 5, a gate line 210 and a gate electrode 231 connected to the gate line 210 are formed on a first transparent substrate 211. For example, materials used for the gate line 210 and the gate electrode 231 may include aluminum (Al), molybdenum (Mo), neodymium (Nd), chrome (Cr), tantalum (Ta), titanium (Ti), tungsten (W), copper (Cu), silver (Ag), etc. These may be used alone or in a combination thereof. The gate line 210 and the gate electrode 231 may have multi-layers sequentially stacked.

Referring to FIGS. 6 and 7, a first insulating layer 212 is formed on the first transparent substrate 211 having the gate line 210 and the gate electrode 231 formed thereon. For example, the first insulating layer 212 may include silicon nitride (SiNx) or silicon oxide (SiOx) and have a thickness of about 4000 Å to about 4500 Å

An active pattern 234 is formed on the first insulating layer 212. The active pattern 234 overlaps with the gate electrode 231. The active pattern 234 may include a semiconductor layer 234a and an ohmic contact layer 234b. For example, the semiconductor layer 234a may include amorphous silicon (a-Si), and the ohmic contact layer 234b may include amorphous silicon doped with n+ ions at a high concentration (n+a-Si).

Figure 9:
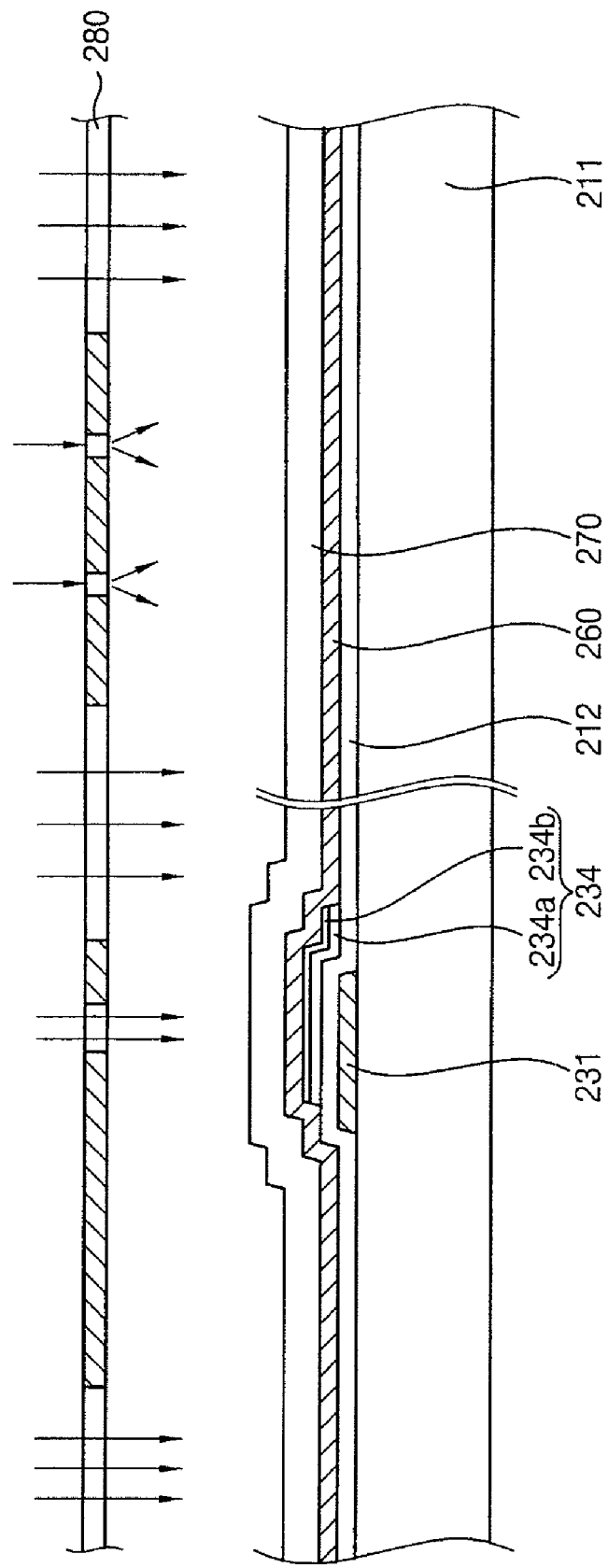
FIGS. 9, 10, 11 and 12 are cross-sectional views of a portion of the first display substrate shown in FIG. 8 illustrating a manufacturing process thereof according to an exemplary embodiment of the present invention.

Referring to FIGS. 8 and 9, a metal layer 260 is formed on the first transparent substrate 211 having the active pattern 234 formed thereon. For example, materials used for the metal layer 260 may include aluminum (Al), molybdenum (Mo), neodymium (Nd), chrome (Cr), tantalum (Ta), titanium (Ti), tungsten (W), copper (Cu), silver (Ag), etc. These may be used alone or in a combination thereof. The metal layer 260 may include multi-layers sequentially stacked.

A photoresist film 270 is formed on the metal layer 260. The photoresist film 270 may include a positive photoresist material of which a portion exposed to light is removed by a developing solution.

The photoresist film 270 is exposed through a slit mask 280 in two ways. A first portion of the photoresist film 270 corresponding to a region between the data line 220 and the light blocking layer 250 is exposed by light passing through a slit portion of the slit mask 280. A second portion of the photoresist film 270 corresponding to a remaining region except for the data line 220, the source electrode 232, the drain electrode 233, and the light blocking layer 250 is fully exposed by light passing through an opening portion of the slit mask 280. Alternatively, the photoresist film 270 may be exposed through a halftone mask.

Figure 10:
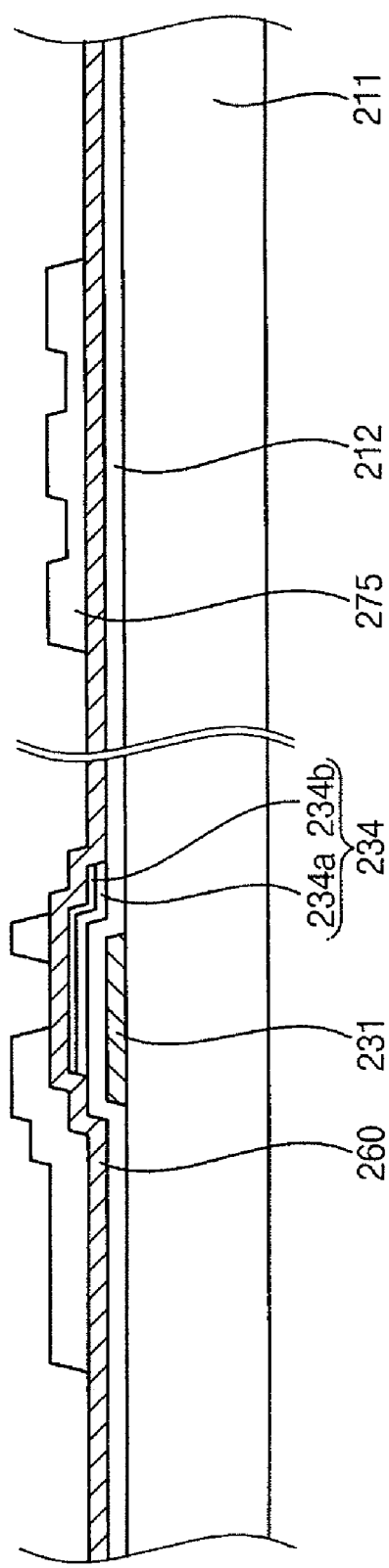

Referring to FIGS. 8 and 10, the photoresist film 270 is developed to form a photoresist pattern 275. When the photoresist film 270 is developed, the second portion of the photoresist film 270, which is fully exposed, is removed, and the first portion of the photoresist film 270, which is exposed by light passing through the slit portion of the slit mask 280, is partially removed to have a smaller thickness than a portion of the photoresist film 270, which is not exposed to light. Therefore, a thickness of the photoresist pattern 275 corresponding to the data line 220 and the light blocking layer 250 may be thicker than a thickness of the photoresist pattern 275 corresponding to the region between the data line 220 and the light blocking layer 250.

Figure 11:
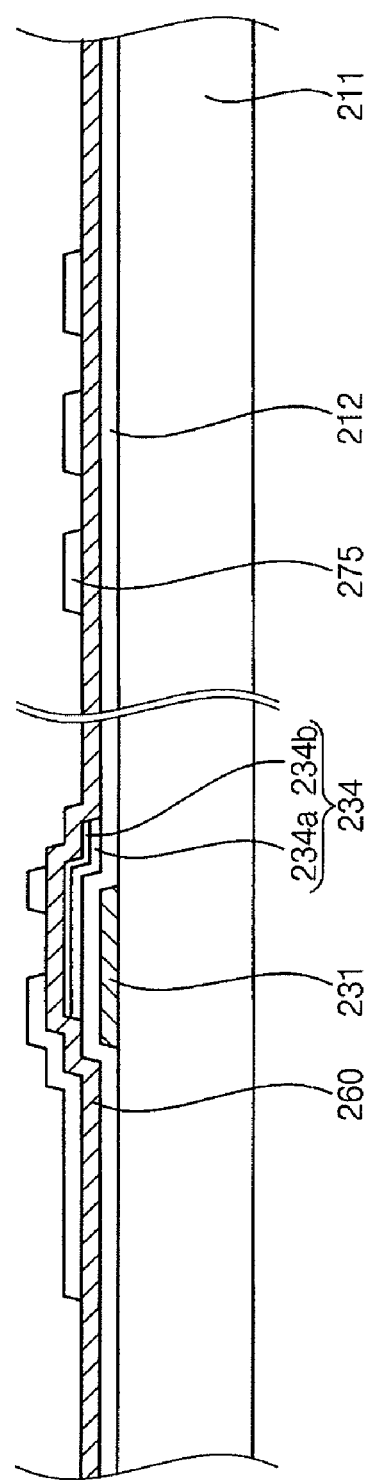

Referring to FIGS. 8 and 11, the photoresist pattern 275 is partially removed by a predetermined thickness through an etch-back process. A portion of the photoresist pattern 275 corresponding to the region between the data line 220 and the light blocking layer 250 is removed through the etch-back process so that a portion of the metal layer 260 corresponding to the region between the data line 220 and the light blocking layer 250 is exposed. The thickness of the photoresist pattern 275 corresponding to the data line 220, the source electrode 232, the drain electrode 233, and the light blocking layer 250 is decreased through the etch-back process.

Figure 12:
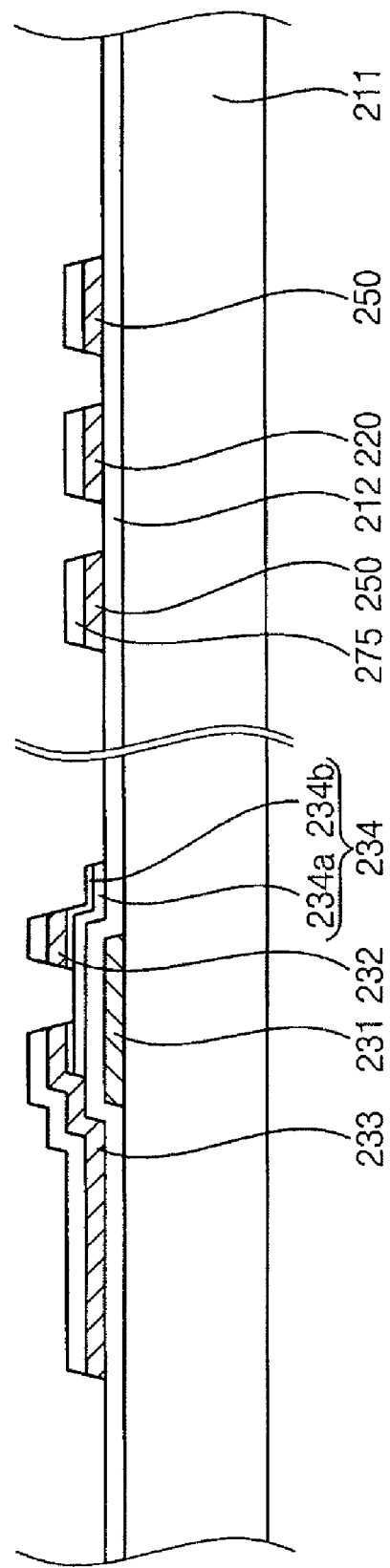

Referring to FIGS. 8 and 12, the metal layer 260 is etched by using the etched-back photoresist pattern 275 as an etch-stop layer. The data line 220, the source electrode 232, the drain electrode 233, and the light blocking layer 250 are formed from the metal layer 260. The light blocking layer 250 may be spaced apart from the drain electrode 233 to remain in a floating state, as shown in FIG. 2. Alternatively, the light blocking layer 250 may be connected to the drain electrode 233, as shown in FIG. 3.

The photoresist pattern 275 remaining on the data line 220, the source electrode 232, the drain electrode 233, and the light blocking layer 250 is removed.

When the data line 220 and the light blocking layer 250 are formed through an exposing process using the slit mask 280 or the halftone mask, the distance between the data line 220 and the light blocking layer 250 is about 3 μm to about 4 μm.

A portion of the ohmic contact layer 234b corresponding to a channel region between the source electrode 232 and the drain electrode 233 is removed to complete the thin film transistor 230 by using the etched-back photoresist pattern 275 or the source and drain electrodes 232 and 233 as an etch-stop layer.

Figure 13:
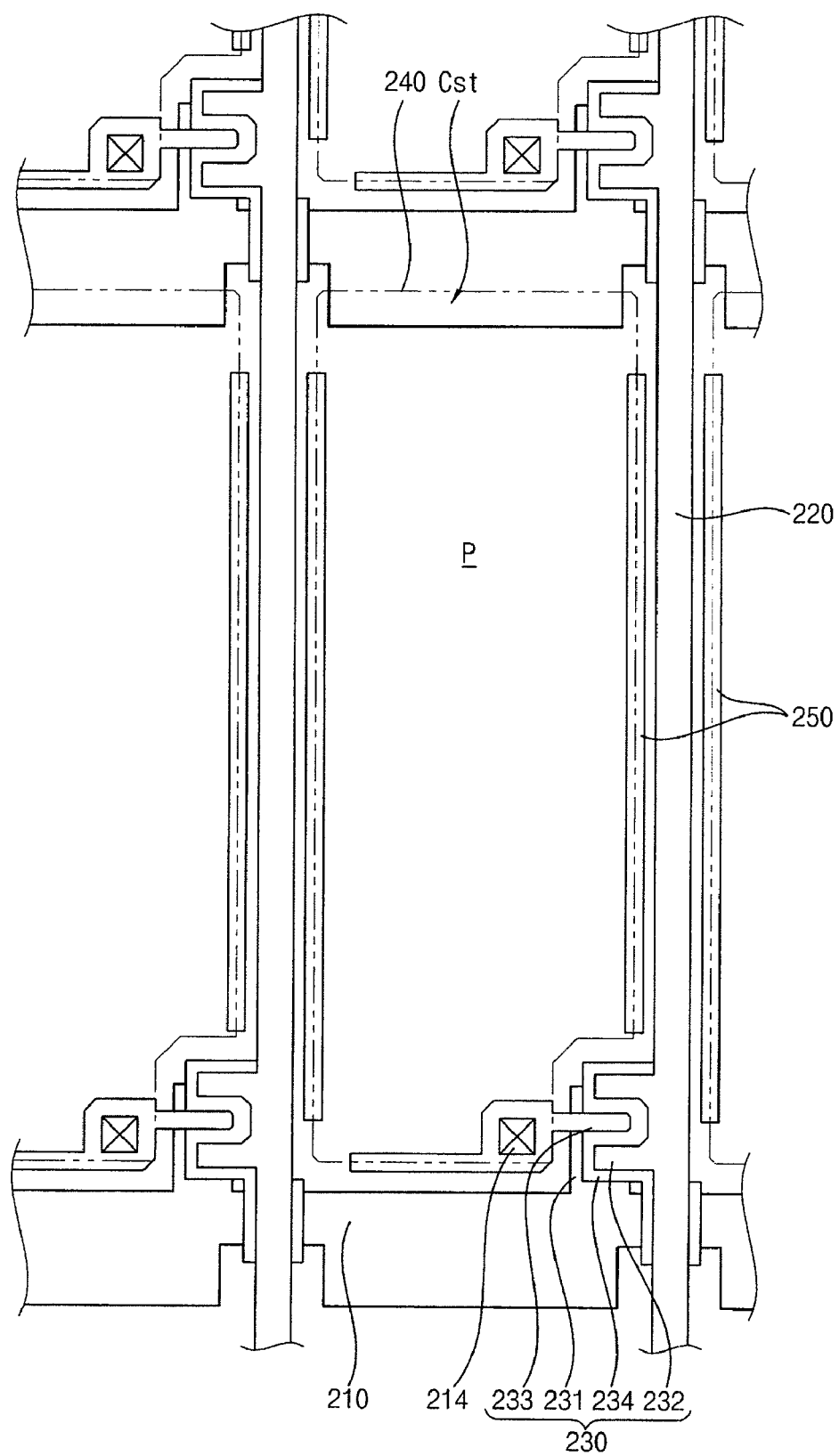
Figure 14:
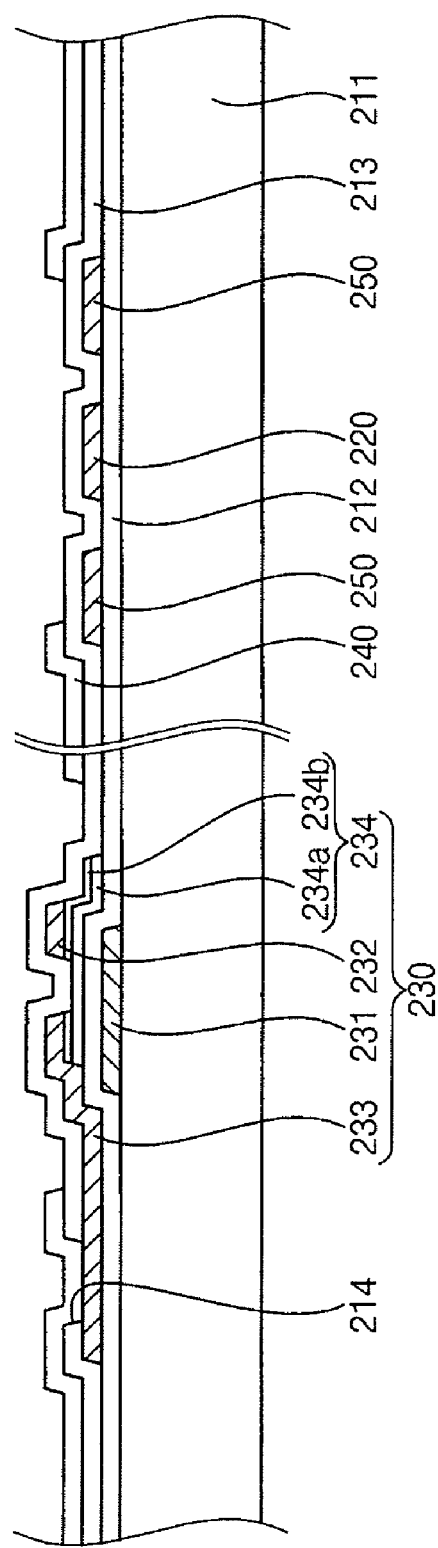
FIG. 14 is a cross-sectional view of a portion of the first display substrate shown in FIG. 13.

Referring to FIGS. 13 and 14, a second insulating layer 213 is formed on the first transparent substrate 211 having the data line 220, the source electrode 232, the drain electrode 233, and the light blocking layer 250 formed thereon. For example, the second insulating layer 213 may include silicon nitride (SiNx) or silicon oxide (SiOx) and have a thickness of about 1500 Å to about 2000 Å.

An organic layer (not shown) may be further formed on the second insulating layer 213 so that the first display substrate 200 is planarized.

The second insulating layer 213 is patterned to form a contact hole 214 exposing a portion of the drain electrode 240 through a photo-etching process.

A pixel electrode 240 is formed on the first transparent substrate 211 having the second insulating layer 213 formed thereon. The pixel electrode 240 is electrically connected to the drain electrode 233 through the contact hole 214 passing through the second insulating layer 213. For example, the pixel electrode 240 may include indium zinc oxide (IZO) or indium tin oxide (ITO).

In the above described exemplary embodiments of the present invention, the data line and the light blocking layer are formed from a same metal layer to be self-aligned. Therefore, a difference between parasitic capacitances formed on the left and right sides of the data line induced by a misalignment of the data line and the light blocking layer with respect to each other may be prevented, and thus, the vertical line spot defect, which is generated by the difference between the parasitic capacitances, may be prevented.

In addition, since the light blocking layer and the data line are formed through the exposing process using the slit mask or the halftone mask, the distance between the light blocking layer and the data line may be reduced so that the aperture ratio may be improved.

Further, since the light blocking layer may be electrically connected to the pixel electrode through the drain electrode, the total parasitic capacitance having an effect on the data line may be reduced and the lateral field between the light blocking layer and the data line may be prevented so that the aperture ratio may be further improved.

While the present invention has been described in detail with reference to the exemplary embodiments, those skilled in the art will appreciate that various modifications and substitutions can be made thereto without departing from the spirit and scope of the present invention as set forth in the appended claims.

What is claimed is:

1. A display substrate, comprising:
   a gate line;
   a data line insulated from the gate line, the data line crossing the gate line;
   a thin film transistor connected to the gate line and the data line and formed in a pixel;
   a pixel electrode formed in the pixel and connected to the thin film transistor; and
   a light blocking layer formed from a same layer as the data line, wherein the light blocking layer is adjacent to a side of the data line and directly connected to a drain electrode of the thin film transistor, and wherein a first insulating layer is disposed between a surface of the display substrate and the light blocking layer in an area where the light blocking layer is overlapped by the pixel electrode.

2. The display substrate of claim 1, wherein the thin film transistor comprises:
   a gate electrode connected to the gate line; and
   a source electrode connected to the data line,
   wherein the drain electrode is spaced apart from the source electrode and electrically connected to the pixel electrode.

3. The display substrate of claim 2, wherein the light blocking layer is electrically separated from the data line, and the source electrode.

4. The display substrate of claim 2,
   wherein the first insulating layer is formed between a first metal pattern having the gate line and the gate electrode, and a second metal pattern having the data line, the source electrode, the drain electrode and the light blocking layer; and the display substrate further comprises:
   a second insulating layer formed between the pixel electrode and the second metal pattern having the data line, the source electrode, the drain electrode, and the light blocking layer, the second insulating layer having a contact hole, through which the pixel electrode is electrically connected to the drain electrode.

5. The display substrate of claim 4, wherein the thin film transistor further comprises an active pattern formed between the first insulating layer and the source and drain electrodes.

6. The display substrate of claim 1, wherein a distance between the light blocking layer and the data line is about 3.0 µm to about 4.0 µm.

7. The display substrate of claim 1, wherein an edge portion of the pixel electrode overlaps with the light blocking layer.

8. A display apparatus, comprising:
   a first display substrate including:
     a gate line;
     a data line insulated from the gate line, the data line crossing the gate line;
     a thin film transistor connected to the gate line and the data line and formed in a pixel;
     a pixel electrode formed in the pixel and connected to the thin film transistor; and
     a light blocking layer formed from a same layer as the data line, wherein the light blocking layer is disposed adjacent to a side of the data line and directly connected to a drain electrode of the thin film transistor, and
     wherein a first insulating layer is disposed between a surface of the first display substrate and the light blocking layer in an area where the light blocking layer is overlapped by the pixel electrode;
   a second display substrate opposite to the first display substrate, the second display substrate including a black matrix formed between the pixels to cover the data line and the light blocking layer; and
   a liquid crystal layer disposed between the first display substrate and the second display substrate.

9. The display apparatus of claim 8, wherein the thin film transistor comprises:
   a gate electrode connected to the gate line; and
   a source electrode connected to the data line,
   wherein the drain electrode is spaced apart from the source electrode and electrically connected to the pixel electrode.

10. The display apparatus of claim 9, wherein the light blocking layer is electrically separated from the data line, and the source electrode.

11. The display apparatus of claim 8, wherein a distance between the light blocking layer and the data line is about 3.0 µm to about 4.0 µm.

* * * * *